(12) United States Patent
Allen et al.

(10) Patent No.: US 9,211,820 B2
(45) Date of Patent: Dec. 15, 2015

(54) CHILD SAFETY SEAT WITH SIDE IMPACT ENERGY REDIRECTION

(71) Applicant: Graco Children's Products Inc., Atlanta, GA (US)

(72) Inventors: Brian Allen, Fort Mill, SC (US); Drew Kitchens, Acworth, GA (US); Daniel Brunick, Alpharetta, GA (US); William Conway, Marietta, GA (US)

(73) Assignee: Graco Children's Products Inc., Atlanta, GA (US)

( * ) Notice: Subject to any disclaimer, the term of this patent is extended or adjusted under 35 U.S.C. 154(b) by 0 days.

(21) Appl. No.: 13/666,628

(22) Filed: Nov. 1, 2012

(65) Prior Publication Data

US 2014/0117729 A1    May 1, 2014

(51) Int. Cl.
*B60N 2/42*  (2006.01)
*B60N 2/28*  (2006.01)

(52) U.S. Cl.
CPC ............ *B60N 2/4235* (2013.01); *B60N 2/2821* (2013.01); *B60N 2/2884* (2013.01)

(58) Field of Classification Search
CPC .. B60N 2/2821; B60N 2/2827; B60N 2/2839; B60N 2/2884; B60N 2/4235
USPC .................. 297/256.16, 250.1, 216.11, 284.9
See application file for complete search history.

(56) References Cited

U.S. PATENT DOCUMENTS

| | | |
|---|---|---|
| 5,219,203 A | 6/1993 | Switlik |
| 5,464,246 A | 11/1995 | Castro et al. |
| 5,468,044 A | 11/1995 | Coman |
| 5,556,129 A | 9/1996 | Coman et al. |
| 5,584,525 A | 12/1996 | Nakano et al. |
| 5,597,205 A | 1/1997 | Glance et al. |
| 5,664,830 A | 9/1997 | Garcia et al. |
| 5,671,978 A | 9/1997 | Olsson |
| 5,716,095 A | 2/1998 | Lopez |
| 5,735,572 A | 4/1998 | Clark et al. |
| 5,795,019 A | 8/1998 | Wieclawski |
| 5,842,738 A | 12/1998 | Knoll et al. |
| 5,913,567 A | 6/1999 | Novak et al. |
| 5,938,279 A | 8/1999 | Schubring et al. |
| 6,033,017 A | 3/2000 | Elqadah et al. |
| 6,058,529 A * | 5/2000 | Goysich .............................. 5/94 |
| 6,142,563 A | 11/2000 | Townsend et al. |
| 6,206,466 B1 | 3/2001 | Komatsu |
| 6,237,991 B1 | 5/2001 | Weber |
| 6,367,859 B1 | 4/2002 | Flory et al. |

(Continued)

FOREIGN PATENT DOCUMENTS

| | | |
|---|---|---|
| DE | 20 2009 003 636 U1 | 6/2009 |
| EP | 2 904 08 B1 | 9/1992 |

(Continued)

*Primary Examiner* — Elizabeth A Plummer
(74) *Attorney, Agent, or Firm* — Sutherland Asbill & Brennan LLP (57) ABSTRACT

A child safety seat has a seat bottom, a seat back coupled to the seat bottom at a seat bight region, and a seating surface defined by the seat bottom and seat back to support a child occupant. A structural element is coupled to the seat bottom, the seat back, or both. A bumper has a substantially rigid component or portion and is mounted to the structural element and protrudes from a side of the child safety seat. The bumper is positioned to redirect energy from a side impact with the child safety seat away from the seat back, the seat bottom, or both and to the structural element.

19 Claims, 9 Drawing Sheets

(56) References Cited

U.S. PATENT DOCUMENTS

| | | | |
|---|---|---|---|
| 6,497,455 | B1 | 12/2002 | Umezawa et al. |
| 6,554,358 | B2 * | 4/2003 | Kain .................. 297/256.13 |
| 6,592,166 | B2 | 7/2003 | Motozawa |
| 6,666,508 | B1 | 12/2003 | Hofmann et al. |
| 6,692,071 | B2 | 2/2004 | Fowler |
| 6,702,387 | B2 | 3/2004 | Munemura et al. |
| 6,789,845 | B2 | 9/2004 | Farquhar et al. |
| 6,869,132 | B2 | 3/2005 | Wang et al. |
| 6,871,913 | B2 | 3/2005 | Malsch et al. |
| 6,896,324 | B1 | 5/2005 | Kull et al. |
| 6,896,325 | B2 | 5/2005 | Takedomi et al. |
| 7,021,655 | B2 | 4/2006 | Saiguchi et al. |
| 7,070,236 | B2 | 7/2006 | Kawashima |
| 7,083,230 | B2 | 8/2006 | Kull et al. |
| 7,125,073 | B2 | 10/2006 | Yoshida |
| 7,159,923 | B2 | 1/2007 | Rajasingham |
| 7,195,312 | B2 | 3/2007 | Crossman et al. |
| 7,219,957 | B1 | 5/2007 | Khouri |
| 7,232,182 | B2 * | 6/2007 | Yoshida .................. 297/216.11 |
| 7,234,771 | B2 | 6/2007 | Nakhla |
| 7,293,828 | B2 * | 11/2007 | Yoshida .................. 297/216.11 |
| 7,316,451 | B2 | 1/2008 | Balensiefer et al. |
| 7,360,832 | B2 | 4/2008 | Yokota et al. |
| 7,387,327 | B2 | 6/2008 | Tencer et al. |
| 7,393,039 | B2 | 7/2008 | Ravid et al. |
| 7,396,065 | B2 | 7/2008 | Leclerre et al. |
| 7,445,284 | B2 | 11/2008 | Gerfast |
| 7,484,801 | B2 | 2/2009 | Kassai et al. |
| 7,506,926 | B2 | 3/2009 | Carine |
| 7,717,506 | B2 | 5/2010 | Amesar et al. |
| 7,726,734 | B2 | 6/2010 | Mahal et al. |
| 7,887,129 | B2 | 2/2011 | Hei et al. |
| 7,959,223 | B2 | 6/2011 | Marsden et al. |
| 8,029,054 | B2 | 10/2011 | Marsden et al. |
| 8,038,209 | B2 | 10/2011 | Marsden et al. |
| 8,052,210 | B2 | 11/2011 | Marsden et al. |
| 8,056,971 | B2 | 11/2011 | Marsden et al. |
| 8,056,972 | B2 | 11/2011 | Marsden et al. |
| 8,061,768 | B2 | 11/2011 | Amirault et al. |
| 8,496,293 | B2 * | 7/2013 | Gaudreau, Jr. ............ 297/216.11 |
| 8,500,196 | B2 * | 8/2013 | Strong et al. ............. 297/216.11 |
| 2002/0153753 | A1 | 10/2002 | Kassai |
| 2006/0125297 | A1 | 6/2006 | Orizaris |
| 2006/0196715 | A1 | 9/2006 | Fujishiro et al. |
| 2006/0261651 | A1 * | 11/2006 | Nolan et al. ................ 297/250.1 |
| 2006/0267317 | A1 | 11/2006 | Ida et al. |
| 2007/0273186 | A1 | 11/2007 | Kurita et al. |
| 2007/0284924 | A1 * | 12/2007 | Gold et al. ................... 297/253 |
| 2008/0106128 | A1 | 5/2008 | Kashiwagi |
| 2008/0106129 | A1 | 5/2008 | Nakhla et al. |
| 2009/0008913 | A1 | 1/2009 | Breuninger et al. |
| 2009/0102253 | A1 | 4/2009 | Forbes et al. |
| 2009/0102254 | A1 | 4/2009 | Veine et al. |
| 2009/0121526 | A1 | 5/2009 | Akaike et al. |
| 2009/0256404 | A1 * | 10/2009 | Strong et al. ............. 297/216.11 |
| 2009/0315371 | A1 | 12/2009 | Shimizu et al. |
| 2009/0322126 | A1 | 12/2009 | Nishiura et al. |
| 2010/0032997 | A1 * | 2/2010 | Gold et al. ................. 297/217.1 |
| 2010/0295346 | A1 | 11/2010 | Marsden et al. |
| 2011/0012398 | A1 | 1/2011 | Powell et al. |
| 2011/0074194 | A1 * | 3/2011 | Weber et al. ............. 297/256.13 |
| 2011/0227376 | A1 | 9/2011 | Franck et al. |
| 2012/0068507 | A1 * | 3/2012 | Debevec et al. ............ 297/250.1 |

FOREIGN PATENT DOCUMENTS

| | | | |
|---|---|---|---|
| EP | 0 646 493 | A1 | 4/1995 |
| EP | 0 680 853 | A1 | 11/1995 |
| EP | 0 565 501 | B1 | 6/1996 |
| EP | 0 733 518 | A1 | 9/1996 |
| EP | 0737 604 | A2 | 10/1996 |
| EP | 0 837 795 | A1 | 4/1998 |
| EP | 0 844 939 | B1 | 12/1998 |
| EP | 1 016 563 | A3 | 7/2000 |
| EP | 0 788 941 | B1 | 12/2002 |
| EP | 0 788 924 | B1 | 3/2003 |
| EP | 1304255 | A2 * | 4/2003 ............... B60N 2/28 |
| EP | 1 178 900 | B1 | 2/2004 |
| EP | 1 140 572 | B1 | 5/2004 |
| EP | 0 913 294 | B1 | 8/2004 |
| EP | 1 136 329 | B1 | 8/2004 |
| EP | 1 339 572 | B1 | 8/2004 |
| EP | 1 449 115 | A2 | 8/2004 |
| EP | 1 104 361 | B1 | 10/2004 |
| EP | 1 344 678 | B1 | 1/2005 |
| EP | 1 149 005 | B1 | 3/2005 |
| EP | 1 586 494 | A2 | 10/2005 |
| EP | 1 021 320 | B1 | 11/2005 |
| EP | 1 247 724 | B1 | 11/2005 |
| EP | 1 434 703 | B1 | 2/2006 |
| EP | 0 940 302 | B1 | 8/2006 |
| EP | 0 860 318 | B1 | 10/2006 |
| EP | 1 493 653 | B9 | 2/2007 |
| EP | 1 304 255 | B1 | 5/2007 |
| EP | 1 790 524 | B1 | 5/2007 |
| EP | 1 585 646 | B1 | 8/2007 |
| EP | 1 502 807 | B1 | 11/2007 |
| EP | 1 896 288 | B1 | 12/2008 |
| EP | 1 700 776 | B1 | 9/2009 |
| EP | 2 141 046 | A1 | 1/2010 |
| EP | 2 230 125 | A1 | 9/2010 |
| EP | 2 243 691 | A1 | 10/2010 |
| EP | 2 292 463 | A1 | 3/2011 |
| EP | 2 334 510 | A1 | 6/2011 |
| EP | 0 804 353 | B1 | 11/2011 |
| EP | 2570299 | A1 * | 3/2013 ............... B60N 2/28 |
| JP | 2001225682 | A * | 8/2001 ............... B60N 2/28 |
| JP | 04141849 | B2 | 8/2008 |

* cited by examiner

CHILD SAFETY SEAT WITH SIDE IMPACT ENERGY REDIRECTION

BACKGROUND

1. Field of the Disclosure

The present invention is generally related to child restraint systems and more particularly to a child restraint system with a mechanism for redirecting side impact energy.

2. Description of Related Art

Child restraint systems such as vehicle safety seats or car seats are well known and are employed to provide a relatively safe seating solution for children when seated in a vehicle. Such car seats are designed to rest on the dedicated vehicle seat and define a seating surface that is more suited to fit a child than the vehicle's seat. The car seat provides a safer seating solution than the vehicle's dedicated seat for the child, particularly in a vehicle crash. It is well known that these types of child car seats help protect a child from injury during such a crash.

A side impact crash occurs when a vehicle is struck on the side, rather than on the front of the vehicle during a crash. Side impact crashes are known to cause a large percentage of the more severe crash related injuries. Many car seats have been designed or at least promoted to include side impact crash protection elements or design enhancements to address side impact crash forces. It is known that consumers recognize these side impact elements and enhancements as a safety feature.

Thus, many car seat manufacturers note some type of side impact protection in their product literature, whether the car seat is specifically design with such a feature or not. Such claims are typically based on testing to and/or compliance with a side impact standard or protocol or based on simply having a feature that may improve side impact protection during a crash. The United States currently does not have a side impact crash standard for these types of car seats or child restraint systems. Manufacturers, or at least those that test for side impact performance, have, as a result, developed their own internal crash tests and performance standards for side impact events. Europe does have such a standard in place.

Some manufacturers have specifically designed and implemented car seats that have been upgraded or enhanced with side impact features. For example, BRITAX™ and DOREL™ employ various types of deformable bladders placed at the side wings on the seat back. These deformable bladders are intended to control air flow to manage energy, i.e., dissipate energy in a controlled manner upon impact, during a side impact event. However, in practice these bladders may deform too easily under low impact forces. Thus, these types of bladders may not provide much energy dissipation under higher impact forces, such as during a high velocity side impact test or crash where the vehicle door intrudes into the vehicle interior space and directly impacts the car seat or child restraint system.

SUMMARY

In one example according to the teachings of the present invention, a child safety seat has a seat bottom with a top surface and a seat back with a front surface. The seat back is coupled to the seat bottom at a seat bight region. A seating surface is defined by the top surface and the front surface and is configured to support a child occupant. A structural element is coupled to the seat bottom, the seat back, or both. A bumper has a substantially rigid portion, is mounted to the structural element, and protrudes from a side of the child safety seat. The bumper is positioned to redirect energy from a side impact with the child safety seat away from the seat back, the seat bottom, or both and to the structural element.

In one example, the seat bottom and the seat back can form a seat and the structural element can be a base to which the seat can be detachably mounted.

In one example, the structural element can be a base that can be coupled to the seat bottom and detached therefrom as desired.

In one example, the structural element can be a substantially rigid seat frame.

In one example, the structural element can be a substantially rigid seat frame. The seat frame can be a metal structure that extends along and is connected to the seat back, the seat bottom, or both.

In one example, the bumper can be a single unitary structure attached directly to the structural element.

In one example, the bumper can include a bracket attached to the structural element and a cover attached to the bracket.

In one example, a bracket of the bumper can be fastened to the structural element by fasteners and a cover of the bumper can be snapped to the bracket hiding the fasteners.

In one example, a bracket of the bumper can be a metal bracket and a cover of the bumper can be plastic cover that attaches to the bracket.

In one example, the seat back and seat bottom can be integrally molded as a unitary plastic shell and the structural element can be formed separately and attached to the plastic shell.

In one example according to the teachings of the present invention, a child safety seat has a molded seat shell forming a seat bottom and a seat back. The seat back is joined to the seat bottom at a seat bight region. A seating surface is defined by a top surface of the seat bottom and a front surface of the seat back and is configured to support a child occupant. A structural element is coupled to the seat shell. Two substantially rigid bumpers are mounted to the structural element. One of the bumpers protrudes from each side of the child safety seat. Each bumper is positioned to redirect energy from a side impact with the child safety seat away from the seat shell to the structural element.

In one example, the structural element can be a base to which the seat shell can be mounted and from which the seat shell can be detached.

In one example, the structural element can be a substantially rigid frame carried by the seat shell.

In one example, the structural element can be a substantially rigid seat frame, which can be a metal structure that extends along and is connected to the seat shell.

In one example, the bumpers can be single unitary structures attached directly to the structural element.

In one example, the bumpers can each include a bracket attached to the structural element and a cover attached to the bracket.

In one example, a bracket of each bumper can be fastened to the structural element by fasteners and a cover of the bumper can be snapped to the bracket hiding the fasteners.

In one example, a bracket of each bumper can be a metal bracket and a cover of each bumper can be a plastic cover attached to the bracket.

In one example, the structural element can be formed separately and attached to the plastic shell.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The disclosed child restraint systems or car seats solve or improve upon one or more of the above-noted and/or other problems and disadvantages of prior known seats and systems. In one example, a car seat is disclosed that has a side impact bumper on a side of the seat that faces a vehicle door when installed. In one example, a disclosed car seat has a side impact bumper on each side of the seat. In one example, a disclosed car seat has a side impact bumper on one or both sides of a separate base to which a car seat mounts. In one example, a disclosed car seat has a side impact bumper on one or both sides of a seat back of the car seat. In one example, a disclosed side impact bumper is a unitary structure mounted directly to a portion of the car seat. In one example, a disclosed side impact bumper has a bracket mounted to a portion of the car seat and a cover counted to the bracket. In one example, a disclosed side impact bumper redirects energy during a side impact crash to the bumper and away from the side wing region of the car seat. These and other objects, features, and advantages of the disclosed car seats and side impact bumpers will be come apparent to those having ordinary skill in the art upon reading this disclosure.

Figure 1:
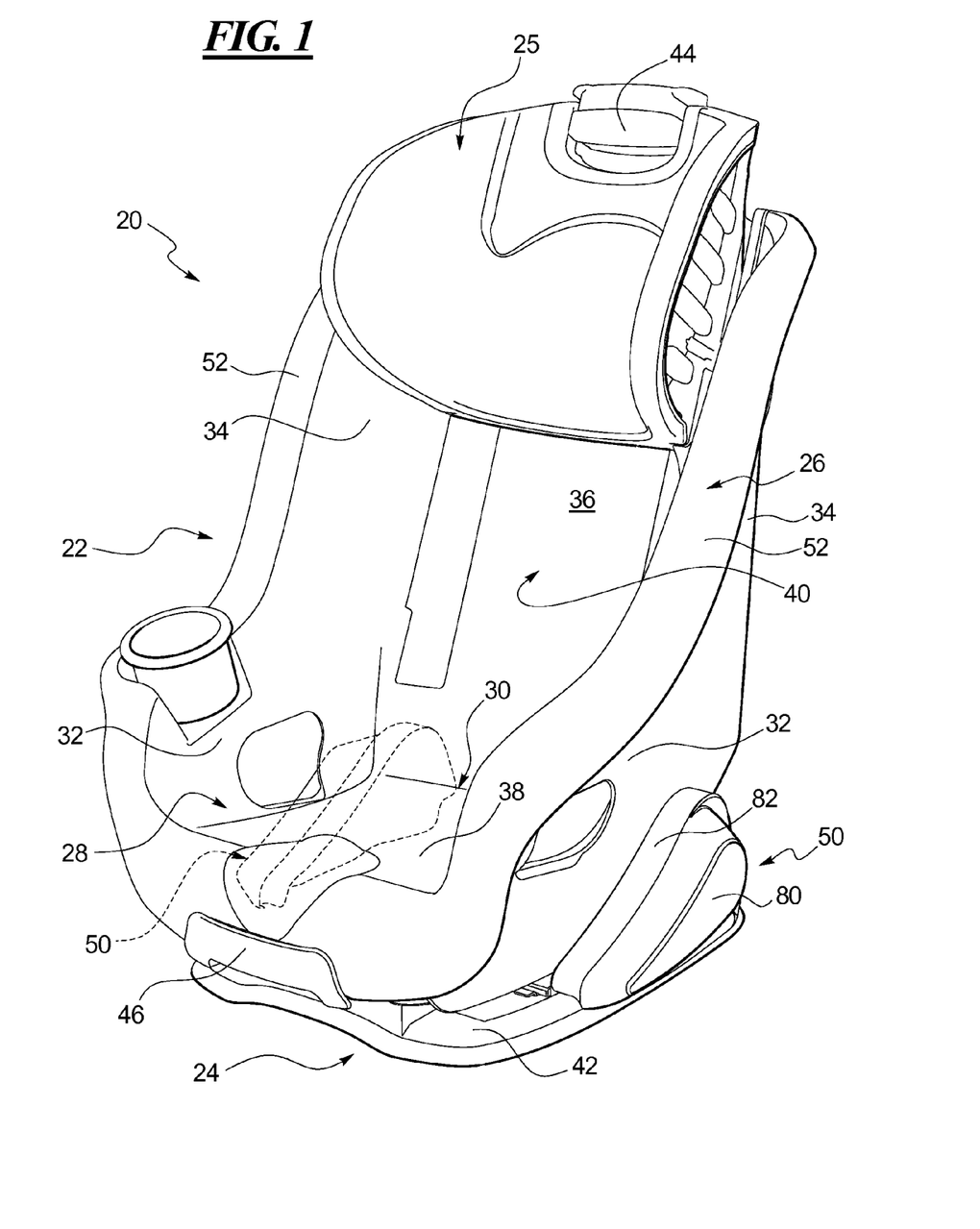
FIG. 1 shows a front and side perspective view of one example of a child safety seat constructed in accordance to the teachings of the present invention.
Figure 2:
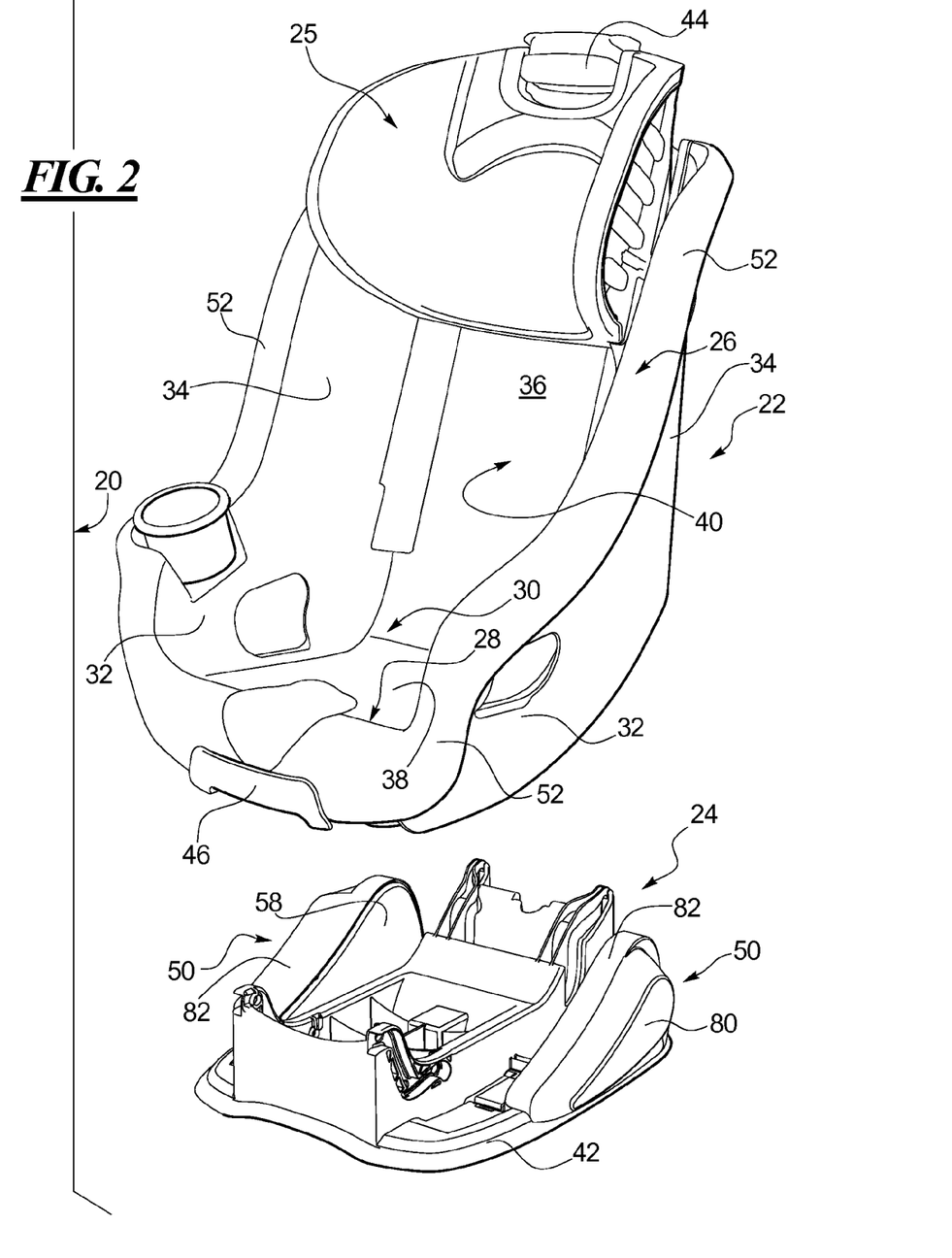
FIG. 2 shows the child safety seat of FIG. 1 with the seat separated from the base.

Turning now to the drawings, FIGS. 1 and 2 show one example of a child safety seat 20 constructed in accordance with the teachings of the present invention. In this example, the child safety seat 20 has two main components including a seat 22 and a base 24. As is known in the art, these types of child safety seats often employee a base, similar to the base 24, that rests directly on a dedicated vehicle seat within a vehicle such as a car, minivan, sport utility vehicle, or truck. The base is typically anchored or otherwise secured to the dedicated vehicle seat. The seat component is typically mounted on and secured to the base. A wide variety of child safety seat designs exist in the marketplace. There are a number of different categories of child safety seats and the designs can vary considerably between the various categories and within each category. These categories can include infant carrier systems, booster seats, toddler seats, convertible seats, and all-in-one seats. Sometimes these seats are generally referred to as child restraint systems. The seats in some categories are designed to accommodate children of only one limited size or age range, whereas the seats in some other categories are designed to accommodate children of two or more different size or age ranges. The seats in the various categories can typically accommodate children from newborn infants to at least grade school aged children as required by law. As will be evident to those having ordinary skill in the art upon reading this disclosure, the side impact energy redirecting bumpers disclosed and described herein may be utilized on virtually any one or more of the above-noted or other child safety seat designs and seat categories.

The child safety seat 20 shown in FIGS. 1 and 2 is a convertible seat that can be utilized with the seat 22 mounted to the base 24 in a rear facing orientation for infants of, for example, up to 40 pounds and with the seat mounted to the base in a forward facing orientation for infants and toddlers from, for example, between about 20 to about 70 pounds. Thus, the child safety seat 20 in this example is of the type that can accommodate more than one size or age child In general, the seat 22 has an adjustable height headrest 25 mounted to a seat back 26 of the seat. A seat bottom 28 is connected to the seat back 26 at a seat bight region 30. The seat 22 has side walls 32 that extend up from the side edges of the seat bottom 28 and side wings 34 that extend forward from the side edges of the seat back 26. The side walls 32 and side wings 34 in this example form a continuous barrier wall B on each side of the seat 22. A front surface 36 of the seat back and a top surface 38 of the seat bottom define a seating surface 40 that supports a child seat occupant during use. Though not shown herein, a safety harness would also be provided on the seat 22 for securing a child on the seating surface 40 during use.

The configuration and construction of the seat 22 can vary considerably and yet fall within the spirit and scope of the present invention. In this example, the seat 22 is a unitary molded plastic shell wherein the seat back 26, seat bottom 28, side walls 32, and side wings 34 are all molded as a single unitary structure. The headrest 25 is a separate structure that is mounted to the seat back and movable relative thereto for height adjustment. In other examples, the seat can be formed of multiple separate components that are joined, fastened, or otherwise assembled to one another.

The base 24 in the disclosed example generally has a platform 42 configured to mate with and engage the seat 22 to securely mount the seat 22 to the base. The base 24, and particularly the platform 42, has a relatively low profile in this example. However, some bases for these types of child safety seats are taller and more bulky. As with the seat 22, the configuration and construction of the base 24 can also vary considerably and yet fall within the spirit and scope of the present invention. The disclosed child safety seat 20 has an actuator 44 on the top of the head rest 25 that is coupled to a mechanism (not shown) for adjusting the height of the head rest. The disclosed child safety seat 20 also has an actuator 46 at the front of the seat bottom 28 that may be coupled to mechanisms (not shown) for altering the incline or recline of the seat 22 relative to the base 24 and/or for latching and unlatching the seat relative to the base. These aspects and features of the child safety seat 20 are not of particular importance to the present invention and are thus not described in any further detail herein.

Figure 3:
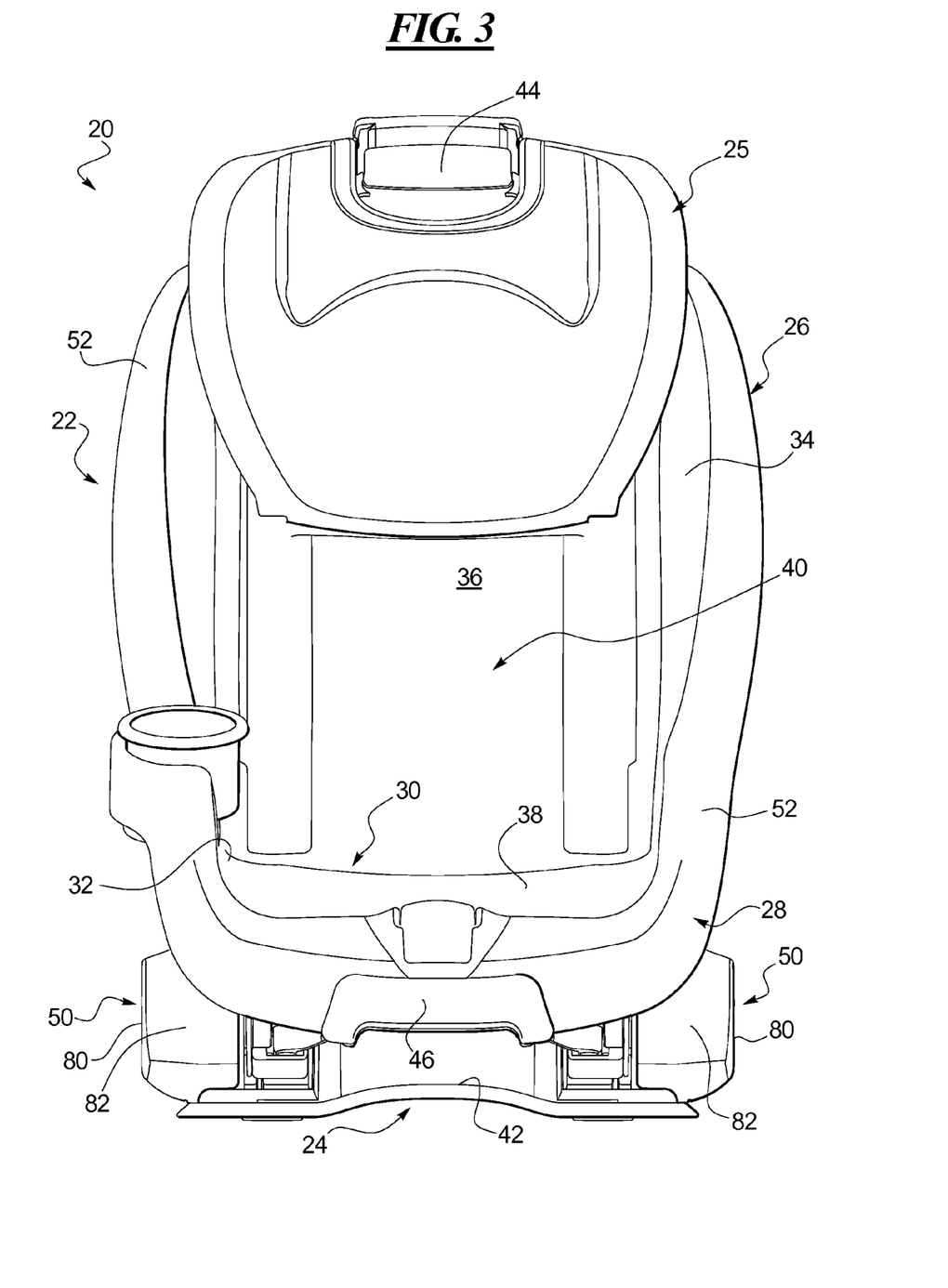
FIG. 3 shows a front view of the child safety seat of FIG. 1.
Figure 4:
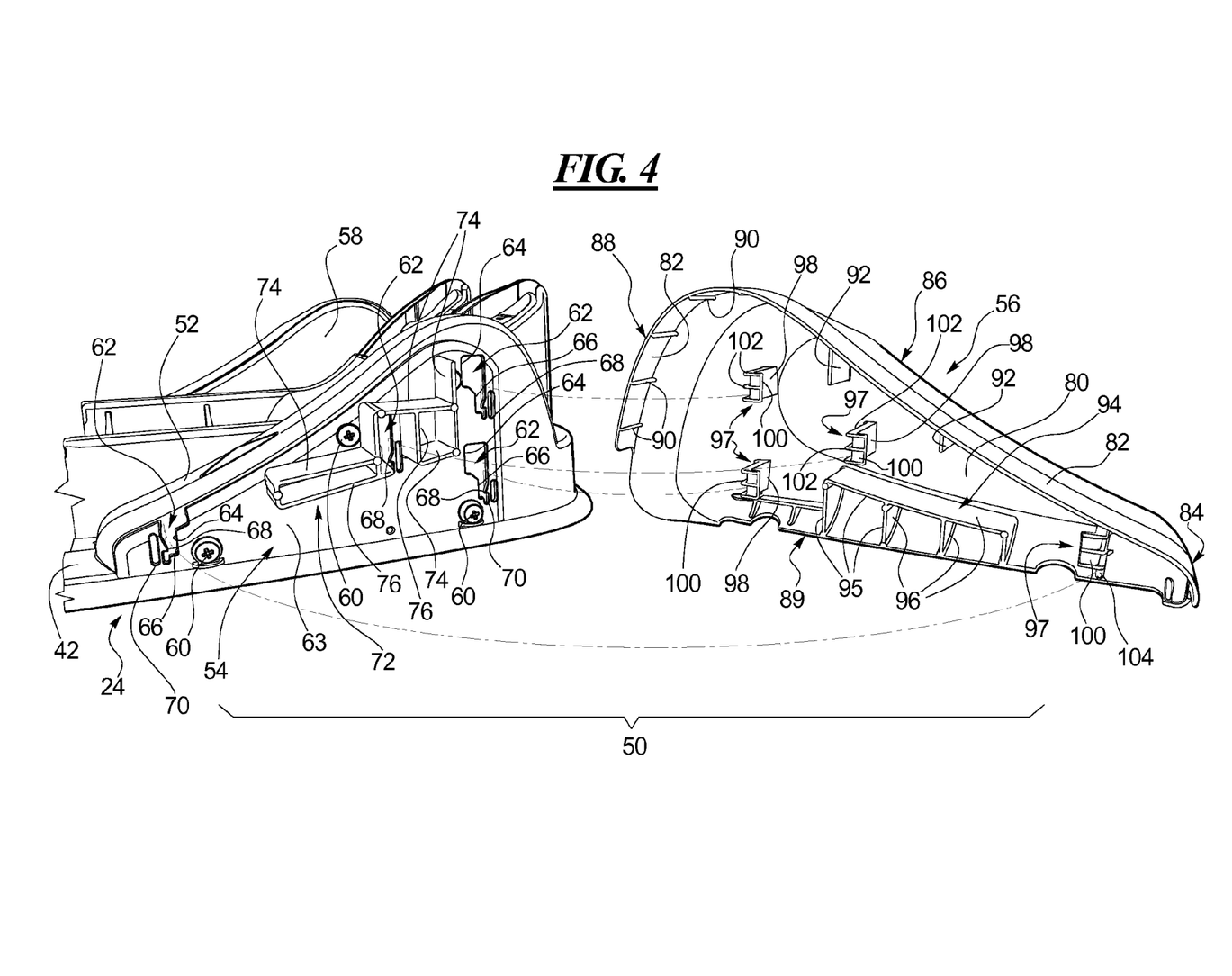
FIG. 4 shows an exploded view of one example of an energy redirecting bumper and configured to be used on the child safety seat of FIG. 1.

With reference to FIGS. 1-4, the child safety seat 20 employs a bumper 50 mounted to each side of the base 24 in this example. As best seen in FIGS. 3 and 4, each bumper 50 projects laterally outward from side portion of the base 24. The side walls 32 and side wings 34 of the seat 22 terminate at a rolled edge 52 that projects laterally outward from the barrier wall B formed by the side walls and side wings. As described in greater detail below, the bumpers 50 extend laterally outward to define an outermost rigid or substantially rigid side impact energy redirecting structure on the child safety seat 20. In this example, the relatively resilient and flexible rolled edges 52 may project slightly further laterally outward than the barrier wall of the side walls 32 and side wings 34, but the barrier walls are positioned inward of the outer extent of the bumpers 50.

FIG. 4 shows one bumper, the left side bumper 50, of the child safety seat 20. The right side bumper 50 is a mirror image thereof. Only the details of the left side bumper 50 are described herein, but it will be understood that the same description applies to both bumpers. The bumper 50 can each be formed of two or more components including a frame structure or bracket 54 and a cover 56. In one example, the bracket 54 can be the structural performance component and the cover 56 can merely be a cosmetic or aesthetic cover. In this example, the frame structure or bracket 54 is configured to correspond in shape with and to mount to a corresponding side panel 58 projecting upward from each side of the platform 42 of the base 24. In one example, the bracket 54 can be a separate component formed of a substantially rigid plastic material, a metal material, or the like and can be attached to the side panel 58 on the base 24. In this example, fasteners 60, such as bolts or screws, are utilized to secure the bracket 54 to the corresponding side panel 58 on the base platform 42.

Each bracket 54 in this example has a plurality of slotted pockets 62 spaced apart on an outward face 63 of the bracket. Each slotted pocket 62 is an opening through the face 63 and has a relatively large sized upper portion 64 and a narrower lower portion 66. A one-way catch 68 is formed protruding inward from an edge of each slotted pocket into the narrower lower portion 66. A shaped seat 70 is formed below the one-way catch 68 and defines the bottom of the slotted pocket 62. A first rib structure 72 protrudes outward from the face 63 of the bracket 54. The configuration and structure of the first rib structure 72 can vary considerably. In one example, the rib structure 72 can include a plurality of interconnected ribs 74 creating a grid or box formation on at least a portion of the face 63. Each of the ribs 74 and/or the rib structure 72 terminates at an exposed edge 76.

Each cover 56 has a face panel 80 that coincides with and confronts the outward face 63 of the respective bracket 54. A perimeter skirt 82 extends inward from the edge of part of the face panel 80, including along a front end 84, a top 86, and a rear end 88 of the cover 56. The perimeter skirt 82 and face panel 80 combine to form a partial enclosure, giving the cover 56 a three-dimensional shape that is sized and contoured to fit over and obscure both the bracket 54 and side panel 58 of the base platform 42 in this example. A lower edge 89 of the face panel 80 does not carry part of the perimeter skirt 82 in this example because this edge will bear directly against the platform 42 of the base 24 when the bumper 50 assembled.

A plurality of ribs 90 and/or gussets 92 can be provided on the interior of and joining the perimeter skirt 82 and face panel 80. These features can provide structural rigidity to the cover 56, if desired. In this example, a second rib structure 94, only generally similar to the first rib structure 72, protrudes inward from the interior side of the face panel 80. This second rib structure 94 also has a plurality of interconnected ribs 96 that form a grid pattern or box structure. The ribs 96 and/or second rib structure 94 also terminate at an exposed free edge 95 within the interior of the cover 56.

A plurality of connectors 97 is spaced apart on and protrudes inward from the interior side of the face panel 80. Each of the connectors 97 is positioned to coincide with a corresponding one of the slotted pockets 62 on the respective bracket 54. Each connector 97 is generally L-shapes and has a leg 98 connected to the face panel 80 and a foot or finger 100 oriented at angle relative to and positioned on a free end of the leg. The leg 98 of each connector 97 can have a vertically oriented blade shape. However, the blade shape of the leg can still be a three dimensional element, giving the connectors structural rigidity and strength. In one example, each leg 98 can have lengthwise extending flanges 102 protruding from a surface of the 98 and from the upper and lower edges of the leg. Likewise, the flanges 102 can continue along the finger 100 to strengthen the finger, as well as the overall connector 97 structure.

Each finger 100 is sized to fit through the larger upper portion 64 of a corresponding slotted pocket 62 in the outward face 63 when the cover 56 is partly installed on the bracket 54. Once the fingers 100 are inserted through the larger upper portions of the slotted pockets 62, the cover 56 can be pushed downward relative to the bracket 54. Each leg 98 is sized to fit widthwise into the narrower lower portion 66, but must first snap past the one-way catch 68 in the slotted pocket 62. Once snapped into place, the cover is securely and permanently attached to the bracket. In one example, one of the flanges 102 on each leg 98 can be configured to snap beyond the one-way catch 68 when installed. A shaped protrusion 104 can be provided below the leg 98 of each connector 97. The shaped protrusion 104 can be configured to register in the shaped seat 70 of the respective slotted pocket 62 in order to precisely located and retain the cover 56 relative to the bracket 54 when installed. The fingers 100 will prevent the cover 56 from being pulled outward off the bracket 54 and the one-way catches 68 will prevent the cover from being lifted upward off the bracket.

The first rib structure 72 on the bracket 54 nests above the second rib structure 94 on the cover 56 when assembled. The exposed free edges 95 of the second rib structure 94 bear against the outward face 63 of the bracket 54 when the cover 56 is snapped into place. Likewise, the exposed edges 76 of the rib structure 72 on the bracket 54 bear against the inside surface of the face panel 80 on the cover. The rib structures 72, 94 combine to render the bumper 50 substantially rigid under compression (in a force direction toward the face panel 80 and the outward face 63) when assembled.

In one alternative example, the bracket 54 can be an integrally molded feature as an integral part of the side panel 58 on each side of the base 24, if desired. In another alternative example, the entire bumper 50 can be provided as an integral substantially rigid structure protruding from each side of the base 24. In yet another example, the bumper 50 can be provided as a single unitary structure that is attached directly to the side panel 58 on each side of the base 24. This alternative would likely leave exposed fasteners that are visible on each of the bumpers 50. The cover 56 in the present example hides the substantially rigid structure of the bracket 54 and the fasteners 60, while producing a relatively pleasing aesthetic. The bracket 54 can be configured to take substantially all of any side impact forces or load on the bumper 50, while the cover 56 can be primarily a cosmetic feature.

The cover 56 in the disclosed example uses snap connections, i.e., the connectors 97, which are not visible to the consumer. There are no fasteners visible from outside of the bumper 50. This bumper design allows the externally attached bumper 50 to integrate nicely onto an existing base 24. Attaching the bumper 50 as secondary components to an existing base 24 allows for more geometry, shape, molding, and structural options in the bumper design without affecting the design of the base. Such a bumper also allows for a single base design to accommodate attachment of multiple optional bumper shapes and sizes in order to achieve different visual and structural performance characteristics, as desired. Integrally molding all or part of the bumper on the side panel 58 of the base 24 would potentially limit such design and component flexibility.

The components of the bumper 50, including the bracket 54 and/or the cover 56, can be fabricated from using rigid plastic materials and/or design structures. As discussed below, the bumpers 50 should attach to a structural portion of the child safety seat away from the child seat occupant, such as to the base in this example. The bracket 54 and cover 56 can be made from the same material or from different materials. The bracket could be plastic, steel, aluminum, or the like and the cover could be plastic, foam, steel, aluminum, or the like.

Figure 5:
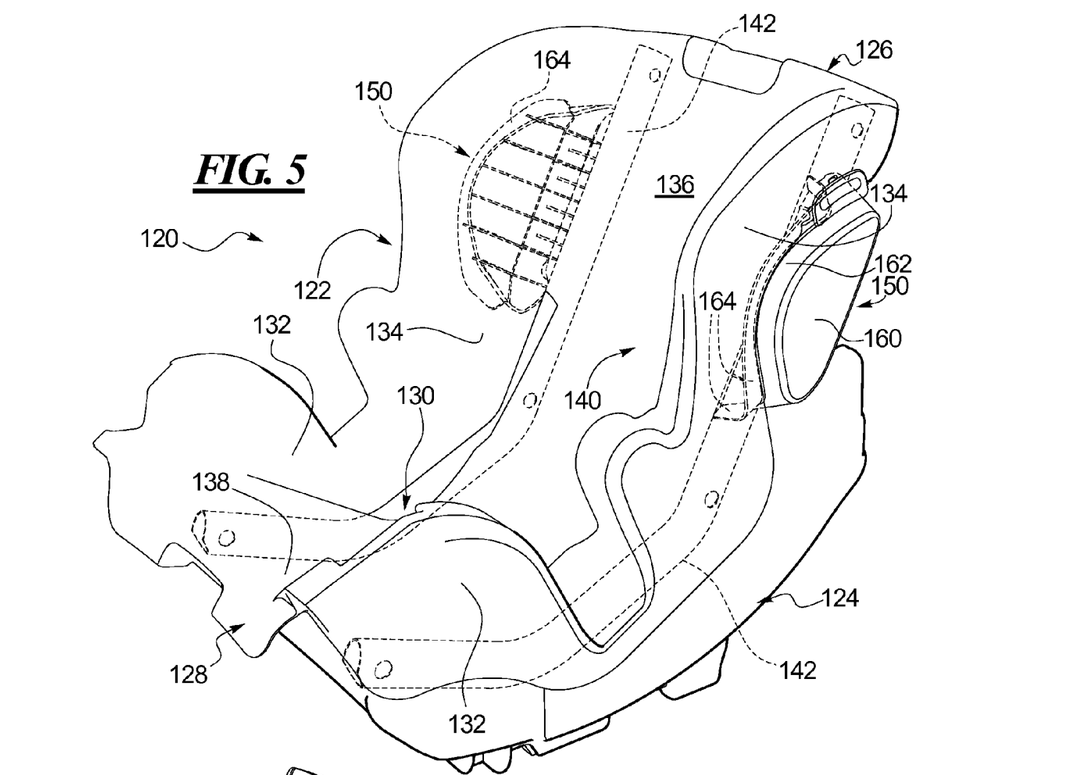
FIG. 5 shows a front and side perspective view of another example of a child safety seat constructed in accordance with the teachings of the present invention.

FIG. 5 shows another example of a child safety seat 120 constructed in accordance with the teachings of the present invention. In this example, the child safety seat 120 also has two main components including a seat 122 and a base 124. The child safety seat 120 in this example is an all-in-one product that may provide front and rear facing capability and may be reconfigured to function as an infant seat with the base 124 and as a booster seat without the base 124 for grade school age children. The child safety seat 120 shown in FIG. 5 in general has a seat back 126 and a seat bottom 128 connected to the seat back 126 at a seat bight region 130 and forming the seat 122. The seat 122 has side walls 132 that extend up from the side edges of the seat bottom 128 and side wings 134 that extend forward from the side edges of the seat back 126. The side walls 132 and side wings 134 in this example form a continuous barrier wall B on each side of the seat 122. A front surface 136 of the seat back 126 and a top surface 138 of the seat bottom 128 define a seating surface 140 that supports a child seat occupant during use. Though not shown herein, a safety harness would also be provided on the seat 122 for securing a child on the seating surface 140 during use.

As with the earlier embodiment, the configuration and construction of the seat 122 can vary considerably and yet fall within the spirit and scope of the present invention. In this example, the seat 122 has a unitary molded plastic shell wherein the seat back 126, seat bottom 128, side walls 132, and side wings 134 are all molded as a single unitary structure. However, the seat 122 in this example also has a robust metal skeleton or frame structure that includes a pair of spaced apart frame elements 142. The frame elements 142 extend along the seat back 126 and continue along a substantial portion of the seat bottom 128. The frame elements 142 provide structure, rigidity, and strength to the seat 122.

Figure 6:
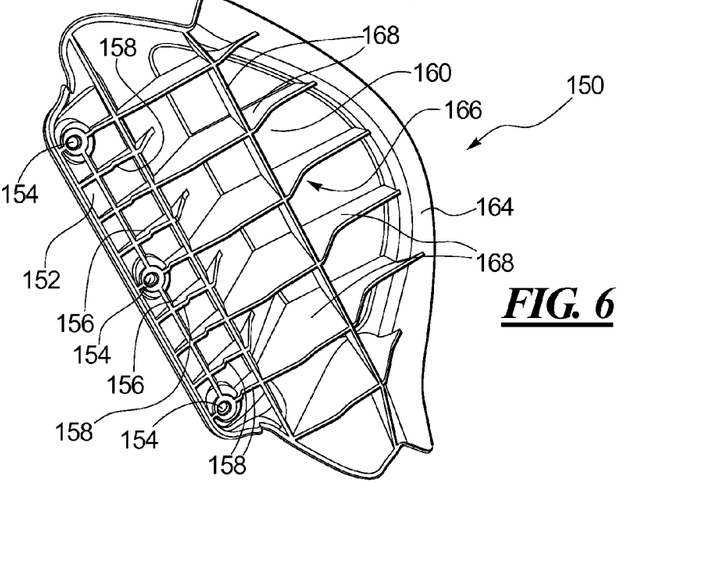
FIG. 6 shows a perspective view of another example of an energy redirecting bumper and utilized on the child safety seat of FIG. 5.
Figure 7:
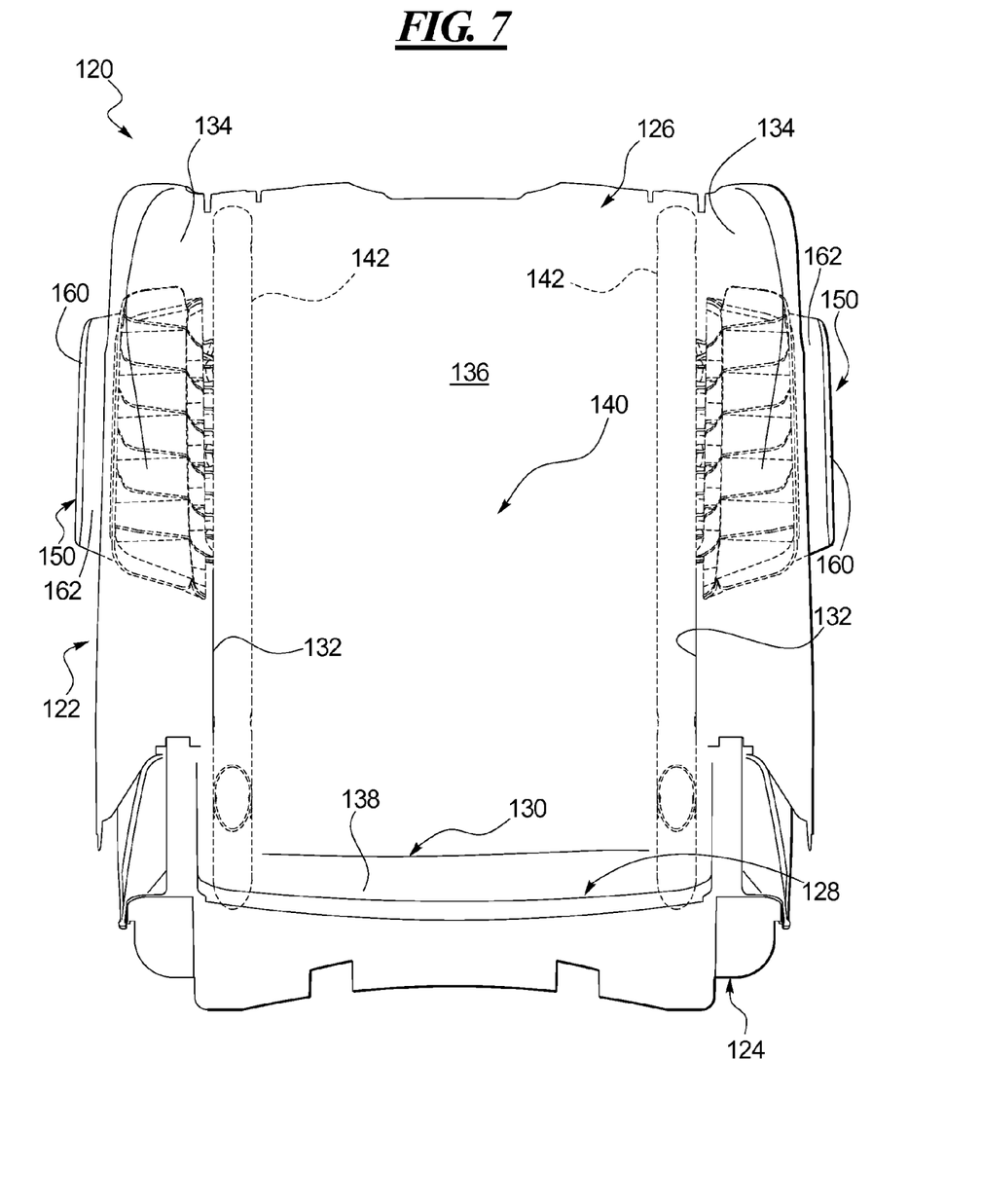
FIG. 7 shows a front view of the of the child safety seat of FIG. 5.
Figure 8:
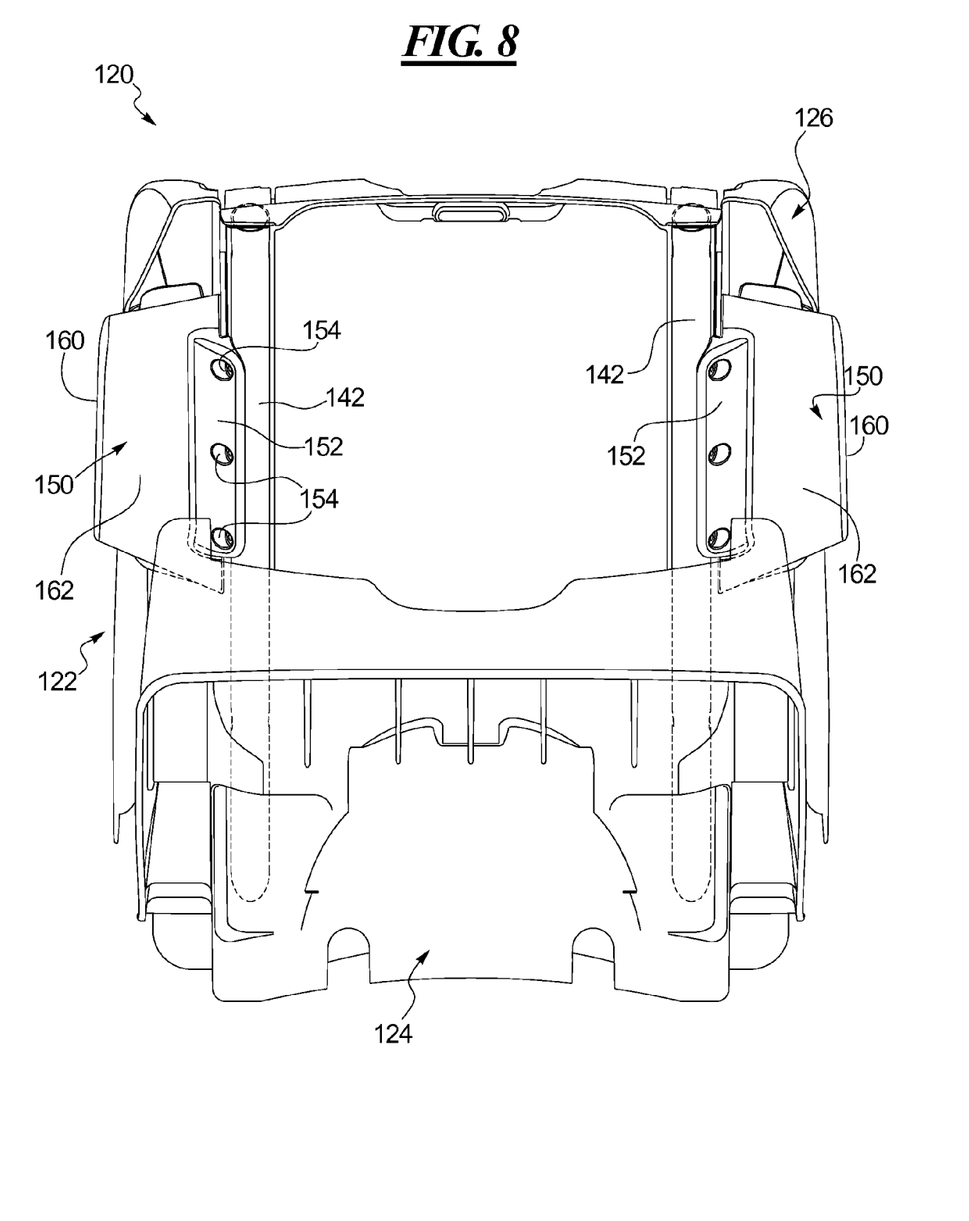
FIG. 8 shows a rear view of the child safety seat of FIG. 5.

In this example, as shown in FIGS. 5-8, a one-piece bumper 150 is mounted to each side of the seat back 126 and protrudes laterally outward. Each bumper 150 has a unitary molded plastic construction with a mounting flange 152. The mounting flange 152 has a number of fastener openings 154 and multiple ribs or gussets 156 on one side. The ribs or gussets 156 can be formed with angles edges 158 configured to fit and lie against one of the frame elements 142. Fasteners are used to secure the bumper 150 directly to the structural frame element 142 as shown in FIGS. 7 and 8.

The bumper 150 has a face panel 160 and a perimeter skirt 162 that extends rearward from an edge of the face panel. In this example, the perimeter skirt 162 extends substantially around the entire face panel. The mounting flange 152 protrudes from one edge of the perimeter skirt 162. The perimeter skirt varies in height around the perimeter of the bumper to accommodate the geometry and contours of the seat back 126. A lip 164 protrudes from a portion of the perimeter skirt 162 opposite the mounting flange 152. As shown in FIG. 5, the lip 164 tucks or nests under an edge or part of the seat 122 shell to assist in integrating the bumper 150 into the visual aesthetics of the seat 122. More importantly, the lip 164 also helps to anchor the bumper 150 under that portion of the seat 122 to prevent tampering by user, i.e., to prevent one from getting a hand, fingers, or an object under the bumper and prying the bumper off or out of position. A rib structure 166 is formed on the inside surfaces of the bumper 150 joining and integrating the face panel 160, perimeter skirt 162, lip 164, and mounting flange 152. The rib structure 166 has a plurality of ribs 168 arranged to form a grid or box structure. The rib structure 166 adds rigidity and integrity to the bumper structure.

The bumpers 150 are fastened directly to a respective one of the metal structural frame elements 142. The fasteners are visible to the consumer, but only from a back side of the child safety seat 120. Since this child safety seat 120 employs the metal frame elements 142, which are also visible, the one-piece structure and visible fasteners of the bumper 150 may be aesthetically acceptable. As shown in FIGS. 7 and 8, the face panels 160 of the bumpers 150 define the outermost lateral extent on each side of the child safety seat. The shape and configuration of the bumpers 50 can vary considerably within the spirit and scope of the present invention. The bumpers 150 can be made from materials other than plastic, such as steel or aluminum. The bumper 150 can be formed having two separate pieces, similar to the bumpers 50 described above, with a bracket or frame attached to the frame elements and a cover attached to the bracket or frame of the bumpers Likewise, the bumpers 150 can attach to the child safety seat at other locations, such as to the base 124, as long as the bumpers are attached to a structural portion of the child safety seat.

The disclosed bumpers 50 and 150 are provided on the respective child safety seats 20, 120 to redirect energy generated during a side impact collision or crash. In a side impact collision, a side panel of the vehicle, such as a rear passenger door, might be struck by another vehicle or a stationary object hit by the moving vehicle. The force of the impact will laterally drive the child safety seat and the passenger door toward one another, and very often into contact with one another. In many such accidents, the force of impact upon the vehicle may severely damage the side panels of the vehicle, including the rear passenger door. This can cause the panel to encroach on the vehicle interior and strike the child safety seat, which is already traveling toward the door as a result of the impact. Such encroachment can increase the energy or force of impact between the door and the safety seat. In a conventional child safety seat, a portion of the seat shell, i.e., the seat bottom or the seat back, will directly and almost immediately make contact with the door. The child seat occupant would also then nearly simultaneously contact the barrier wall of the seat shell in the direction of the impact. This type of impact can cause significant injury, such as to the head and neck of the child seat occupant.

In each of the example disclosed herein, the bumpers 50, 150 are configured as a substantially rigid component that is connected to a structural portion of the child safety seat 20 or 120 and not to the seat (20 or 120) itself. The bumper 50 is attached to the side panel 58 on the base 24 in the first embodiment. The bumper 150 is attached directly to the metal frame element 142 of the seat 122 in the second embodiment. Further, the substantially rigid nature of the bumpers 50, 150 in each of the disclosed examples is not intended to dissipate energy of impact by creating a controlled crush of the bumper. The prior known air bladder components are used for that purpose. Instead, the bumper 50, 150 are intended to redirect energy of the impact away from the seat shell and thus the child seat occupant, and into a structural component of the child safety seat. Thus, the disclosed bumpers 50, 150 can significantly reduce the energy at impact if and when the child seat occupant's head or body strikes the barrier wall of the seat shell during the crash because much of the energy is redirected away from the seat.

Figure 9:
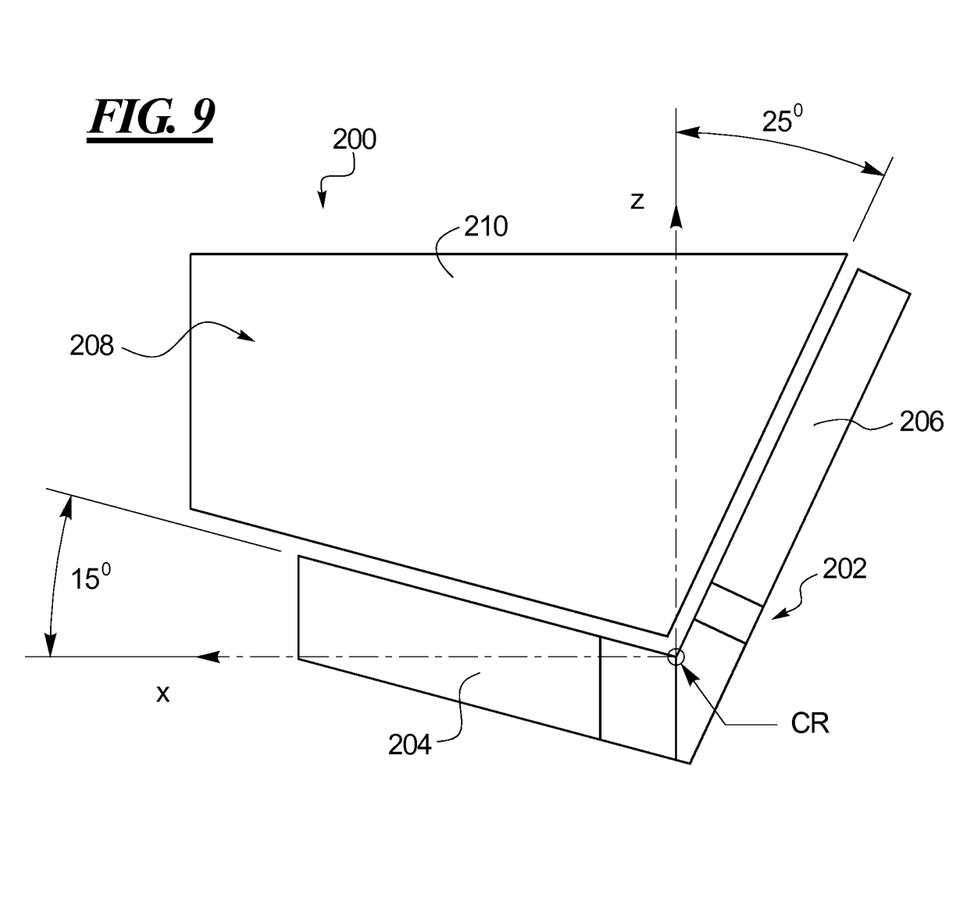
FIG. 9 shows a schematic of a door panel simulator for a side impact test buck used to test crash performance of child safety seats such as those disclosed herein.

FIG. 9 depicts a schematic illustration of a test buck or fixture 200 that was used to simulate a vehicle door and to test crash performance of the child safety seat 20 disclosed herein. In this example, the test fixture 200 included a vehicle seat fixture 202 having a seat bottom 204 and the seat back 206 arranged to simulate a dedicated vehicle seat. Though not depicted in FIG. 9, the child safety seat 20 was secured to the seat fixture 202 during each test to simulate actually installation in a vehicle. The test fixture 200 also had a simulated door panel 208 constructed to simulate an interior surface of a vehicle door panel including trim and padding. The simulated door panel 208 included a contact layer 210 fabricated from materials, such as foam, plastic, and fabric, commonly used to fabricate vehicle interior trim. The contact layer 210 was mounted to a rigid metal plate 212, which in turn was carried by a fixture frame 214 (see FIGS. 10B and 11B). In such a test fixture 200, either the vehicle seat fixture 202 and child safety seat or the simulated door panel 208 can be moved relative to the other to create high-energy contact to simulate a side impact event.

Figure 10A:
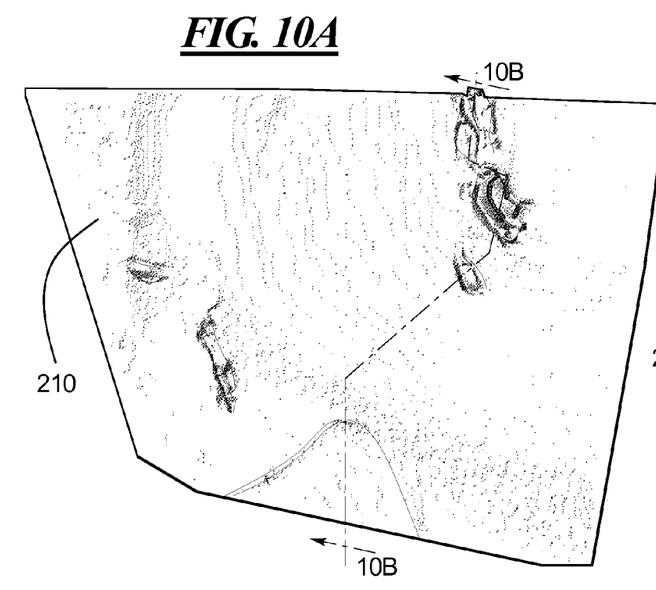
FIG. 10A shows a plan view of a door panel simulator like that in FIG. 9, and after testing side impact crash performance of a conventional child safety seat similar to that of FIG. 1 but without the bumpers shown therein and in FIG. 4.
Figure 10B:
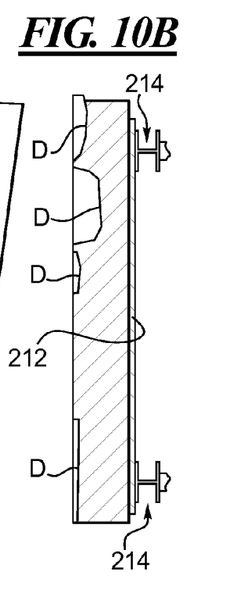
FIG. 10B shows a cross-section taken along line 10B-19B in FIG. 10A of the door panel simulator.

Various tests were conducted to compare the performance of conventional child safety seats to the child safety seats of the invention. In one example, a child safety seat 20 was tested and compared to the conventional safety seat of the same structure, but without the bumpers 50. FIGS. 10A and 10B show the simulated door panel 208 after a side impact test of the conventional child safety seat. The test results indicated, by the depth and location of damage D to the simulated door panel 208, where the greater impact loads or forces were imparted on the child safety seat. As depicted, the barrier wall of the seat back side wing produced the greatest depth of penetration or damage D into the simulated door panel 208 and thus the greatest force of impact.

Figure 11A:
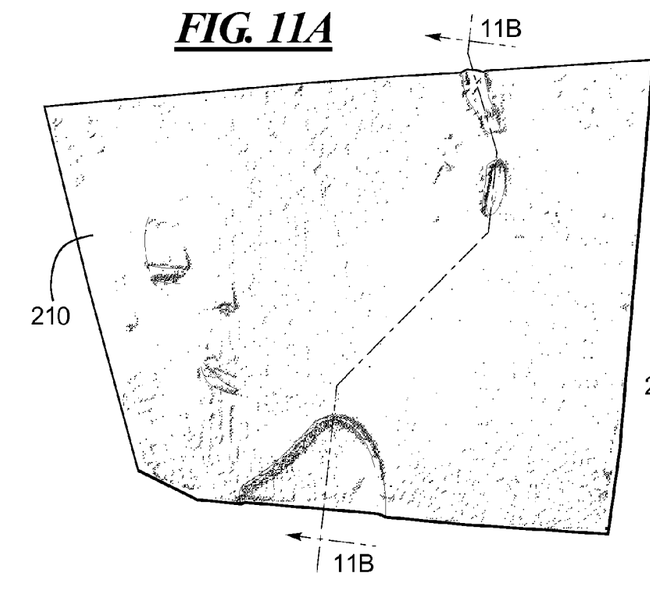
FIGS. 11A and 11B show a plan view and cross-section view of a door panel simulator like that in FIGS. 10A and 10B, but after testing side impact crash performance of a child safety seat with bumpers as depicted in FIGS. 1-4.
Figure 11B:
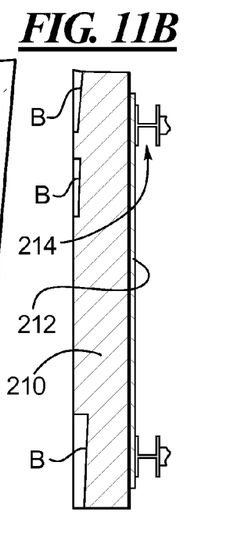

FIGS. 11A and 11B show an identical simulated door panel 208 after side impact test of the child safety seat 20 under the same force of impact and other test conditions and using the same test fixture 200. The tests indicated that a majority of the impact load or force was imparted to the bumper 50 on that side of the child safety seat 20, much lower than for the conventional seat and well below the region of the occupant's head. The bumper 50 in turn redirected much of the energy of the impact into the seat base 24, away from the seat back 26 of the seat 22 and thus away from the child seat occupant. The depth of penetration or damage B caused by the bumper 50 into the simulated door panel 208 was significantly greater than that caused by any other portion of the seat 22. Thus, significantly less energy was imparted to the seat back side wing on the seat 22 for the child safety seat 20.

The bumpers 50 and 150 are disclosed herein as being substantially rigid and intended not to dissipate energy through controlled crush of the bumpers. However, the bumpers 50, 150, or portions of the bumpers, such as the cover 56, could be designed to have a semi-deformable construction. A certain amount of controlled deformability or crush could be designed into the bumpers rather than the bumpers being completely rigid. The bumpers could be designed to become substantially rigid after a certain amount of energy dissipation or deformation to then redirect impact forces or energy away from the seat and occupant.

In one example, the external cover 56 of the bumper 50 or the face panel of the bumper 150 could have a softer foam material on the exterior face to improve the touch or feel of the bumper as well as to soften the initial impact contact. This feature could be provided as a molded foam layer on the cover or bracket, such as EPS, EPP, dense urethane, or the like. In another alternate example, the cover 56 could be screwed, glued, riveted, bolted, or otherwise attached to the bracket instead of being snapped in place as disclosed herein.

The bumper 50 described above is a two-part assembly attached to the seat base 24 and includes a rigid frame or bracket (structural element) and a cosmetic cover over the bracket. The bumper bracket 54 is fastened to the seat base 24 using fasteners 60, such as screws and/or bolts. The bumper cover 56 is snapped onto the bumper bracket using one-way snap connectors 97. The bumper 150 is a single molded plastic piece that attaches to the steel skeleton or frame element 142 of the seat 122. This construction can save cost and complexity, but could be aesthetically less pleasing to consumers because of the potential for visible fasteners. Either type of bumper construction can be used on a given child safety seat application. Also, either type of bumper construction can be used on any suitable location on a given child safety seat to redirect energy away from the seat and the occupant. The seat frame can be an integral molded rigid skeleton on the seat back and/or seat bottom, instead of being a separate structure. Likewise, the frame elements need not be metal, but instead can be formed of other suitable materials such as plastic, composites, reinforced non-metal or metal materials, or the like.

On the child safety seat 20, the bumpers 50 will direct the energy of the impact into the base/lower area of the structure. This redirects the energy away from the occupant's head. During testing, it was observed that the bumper 50 would begin to move the child safety seat 20 away from the simulated door panel 208 as the bumper impacted the panel. The structure of the bumpers should be designed to be substantially rigid in the direction of impact. The bumper structure is not intended to be designed to flex or deform in the direction of impact (at least beyond a certain point designed for controlled deformation to dissipate some energy) during a side impact event. The bumpers manage the crash energy/forces by directing them away from the occupant altogether and instead directing the energy/forces into the lower/structural region (i.e., the base) or other structural components (i.e., a metal frame or beam element) of the child safety seat.

The disclosed child safety seats performed better during similar tests in comparison to competitor seats. Some competitive seats use deformable bladders in the head region or the seat, as noted above. These air bladders deformed rather quickly and easily under even low side impact loads. When a high impact load occurred in a side impact test, such bladders too easily collapsed without dissipating enough energy to significantly reduce impact forces/loads in the region of the occupant's head. Instead of attempting to dissipate energy, the disclosed bumpers redirect energy away from the seat and occupant during a side impact collision.

Although certain car seats, energy redirecting bumpers, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A child safety seat comprising:
   a seat bottom having a top surface;
   a seat back having a front surface, the seat back coupled to the seat bottom at a seat bight region;
   a seating surface defined by the top surface and the front surface and configured to support a child occupant;
   a structural element coupled to the seat bottom, the seat back, or both; and
   a bumper has a substantially rigid portion and is mounted to the structural element and protrudes from a side of the child safety seat, the bumper positioned to redirect energy from a side impact with the child safety seat away from the seat back, the seat bottom, or both and to the structural element.

2. A child safety seat according to claim 1, wherein the seat bottom and the seat back form a seat and wherein the structural element is a base to which the seat can be detachably mounted.

3. A child safety seat according to claim 1, wherein the structural element is a base coupled to the seat bottom.

4. A child safety seat according to claim 1, wherein the structural element is a substantially rigid seat frame.

5. A child safety seat according to claim 4, wherein the seat frame is a metal structure that extends along and is connected to the seat back, the seat bottom, or both.

6. A child safety seat according to claim 1, wherein the bumper is a single unitary structure attached directly to the structural element.

7. A child safety seat according to claim 1, wherein the bumper includes a bracket attached to the structural element and a cover attached to the bracket.

8. A child safety seat according to claim 7, wherein the bracket is fastened to the structural element by fasteners and the cover is snapped to the bracket hiding the fasteners.

9. A child safety seat according to claim 7, wherein the bracket is a metal bracket and the cover is a plastic cover.

10. A child safety seat according to claim 1, wherein the seat back and seat bottom are integrally molded as a unitary plastic shell and the structural element is formed separately and attached to the plastic shell.

11. A child safety seat comprising:
    a molded seat shell forming a seat bottom and a seat back, the seat back joined to the seat bottom at a seat bight region;
    a seating surface defined by a top surface of the seat bottom and a front surface of the seat back and configured to support a child occupant;
    a structural element coupled to the seat shell; and
    two substantially rigid bumpers mounted to the structural element, one of the bumpers protruding from each side of the child safety seat, each bumper positioned to redirect energy from a side impact with the child safety seat away from the seat shell to the structural element.

12. A child safety seat according to claim 11, wherein the structural element is a base to which the seat shell can be mounted and from which the seat shell can be detached.

13. A child safety seat according to claim 11, wherein the structural element is a substantially rigid frame carried by the seat shell.

14. A child safety seat according to claim 13, wherein the frame is a metal structure that extends along and is connected to the seat shell.

15. A child safety seat according to claim 11, wherein the bumpers are single unitary structures attached directly to the structural element.

16. A child safety seat according to claim 11, wherein the bumpers each include a bracket attached to the structural element and a cover attached to the bracket.

17. A child safety seat according to claim 16, wherein the bracket is fastened to the structural element by fasteners and the cover is snapped to the bracket hiding the fasteners.

18. A child safety seat according to claim 16, wherein the bracket is a metal bracket and the cover is a plastic cover.

19. A child safety seat according to claim 11, wherein the structural element is formed separately and attached to the seat shell.

* * * * *